United States Patent [19]

Hira

[11] Patent Number: 5,394,383
[45] Date of Patent: Feb. 28, 1995

[54] METHOD OF CONTROLLING REPRODUCTION FINISH OF OPTICAL DISC REPRODUCING APPARATUS AND THE OPTICAL DISC REPRODUCING APPARATUS

[75] Inventor: Osamu Hira, Tokorozawa, Japan

[73] Assignee: Pioneer Electronic Corporation, Tokyo, Japan

[21] Appl. No.: 50,535

[22] Filed: Apr. 20, 1993

[30] Foreign Application Priority Data

Apr. 24, 1992 [JP] Japan .................. 4-107093

[51] Int. Cl.[6] .............................................. G11B 7/085
[52] U.S. Cl. ........................................ 369/32; 369/33; 369/44.32; 369/58; 369/47
[58] Field of Search ............. 369/32, 33, 44.27, 44.28, 369/44.25, 44.34, 47, 48, 54, 58, 59, 124, 44.32, 56, 57

[56] References Cited

U.S. PATENT DOCUMENTS 5,012,461 4/1991 Yoshida et al. ................ 369/32
5,172,354 12/1992 Otsubo ...................... 369/44.27
5,241,521 8/1993 Shigemori .................... 369/32

Primary Examiner—W. R. Young
Assistant Examiner—Muhammad N. Edun
Attorney, Agent, or Firm—Kane, Dalsimer, Sullivan, Kurucz, Levy, Eisele and Richard

[57] ABSTRACT

The reproduction finish of an optical disc reproducing apparatus is controlled. The optical disc has a program area, in which information is recorded one after another in a radial direction from an inner circumference toward an outer circumference. The information includes recording position information arranged at a predetermined interval in the radial direction. The controlling method includes the steps of: reading the recording position information one after another; continually comparing a presently read recording position information with a previously read recording position information; moving a reading position toward the outer circumference; distinguishing whether reading of the information at the reading position after moving is normal or not; and moving the reading position toward the inner circumference, and finishing the information reproduction.

13 Claims, 6 Drawing Sheets

METHOD OF CONTROLLING REPRODUCTION FINISH OF OPTICAL DISC REPRODUCING APPARATUS AND THE OPTICAL DISC REPRODUCING APPARATUS

BACKGROUND OF THE INVENTION

1. Field of the Invention

The present invention is related with an reproduction finishing method of an optical disc reproducing apparatus. Especially, it is related with a method of controlling reproduction finish, which is suitable to the reproduction finishing operation at the end of the program area in the middle of writing about an optical disc of write once read many type, such as a CD-R (CD Recordable).

The present invention is also related with an optical disc reproducing apparatus to enable such a reproduction finishing method.

2. Description of the Related Art

There is a CD (Compact Disc) as an optical disc which records sound information etc. An example of such a CD is shown in FIG. 1.

As shown in FIG. 1, in a CD 104, a lead in area LIA in which index information of the record information is recorded, a program area PA in which the actual music information etc. is recorded, and a lead out area LOA which indicates the end of the program area PA, are sequentially formed from the inner circumference of the disc of the CD 104.

The signal recorded on the optical disc is the digital signal modulated by EFM (Eight to Fourteen Modulation), which includes sub-codes, such as a time code (time information), other than main codes (main information), such as music information. Index information called TOC (Table Of Contents) is recorded in the lead in area LIA. The total number of the pieces of the record information recorded in the program area PA of the optical disc (for example, the total number of musics), the total recording time (for example, the total performance time), etc., are recorded as a sub-code in the index information. Music information etc. as a main code is recorded in the program area PA. In addition to this, the track number (TNO) which indicates the piece number of the record information (for example, music number), the recording time from the track start (P-TIME: for example, the performance time of the music), the total recording time measured from TNO=1 (A-TIME: for example, the total performance time), are recorded in the channel Q data of the sub-code. The lead out code which indicates it is the lead out area, is recorded in the lead out area LOA.

A CD player, which reproduces the record information on the above mentioned CD 104, is constituted to perform the following operation. Namely, when the CD is set, the CD player moves a pickup, which is an optical head, to a predetermined initial position. After this, it performs a set up (SET-UP) to be in the state where the information reading is possible, by rotating the CD. When the set up is completed, it reads the TOC information from the lead in area LIA. The track number of the last piece (LTNO) of the record information of the program area PA, is generally included in the TOC information. Thus, the last record information can be recognized by the LTNO, so that it can finish the reproduction.

By the way, the CD which has a record format mentioned above, is a record medium only for reproduction. However, a CD-R, which is a recordable optical disc of write once read many type, to enable writing of information, while employing the same format as the CD, is desired.

The record format standard of this CD-R is unified by the standard so called "orange book", which is based on the CD format standard (which is called "red book").

As shown in FIG. 1, the disc of this CD-R, is classified into three categories (CD-R 101 to 103), according to the recording state, as following.

(1) A blank disc i.e. a CD-R 101 in FIG. 1, which is in the non-recorded state where information is not yet recorded (it is referred as a "blank CD-R", hereinbelow).

(2) A disc i.e. a CD-R 102 in FIG. 1, which is in the middle of writing, where information is partially recorded (Partially Recorded disc, which is referred as a "partial CD-R", hereinbelow).

(3) A disc i.e. a CD-R 103 in FIG. 1, which is finished with writing and finally formatted to have the almost same format as the CD 104 after completing recording (Finalized Disc, it is referred as a "finalized CD-R", hereinbelow).

As shown in FIG. 1, in the finalized CD-R 103, the lead in area LIA, the program area PA and the lead out area LOA, are formatted in the same manner as the CD 104.

Information record and reproduction are generally performed by the recording and reproducing apparatus for the exclusive use with respect to the CD-R. The guiding groove is formed at the record track of the CD-R. This guiding groove is wobbled by the frequency which is generated by FM-modulating the conveyance wave by the data which indicates an absolute time (ATIP:Absolute Time In Pregroove).

The recording and reproducing apparatus of the CD-R is constituted to control the record and reproduction with respect to the blank CD-R and the partial CD-R in the middle of writing, while carrying out the track and spindle control by use of the guiding groove. As shown in FIG. 1, the PMA (Program Memory Area) as a domain of a temporary TOC which stores the record history of the record information LIA, is prepared in the inner circumference of the lead in area of the partial CD-R 102. The PCA (Power Calibration Area) to perform trial writing, in order to obtain a suitable record laser power for each disc, is also prepared in the inner circumference.

Three kinds of information is recorded in the PMA, as following.

Firstly, the start address and end address etc., of the record information recorded in the program area, are recorded. These are recorded by use of the same format as the TOC information recorded in the lead in area of the CD 104.

Secondly, the disc distinguishing information (option) is recorded, to which numeral information of 6 figures (6 digits) for disc distinguishing, is recorded depending on the necessity.

Thirdly, skip command information and skip canceling information are recorded, which are constituted to skip each record area indicated by the TNO specified at the time of disc reproduction, or a portion (time specification is possible) of the record area indicated by the TNO.

In this manner, the reason why the information as a temporary TOC is recorded to the PMA in the partial CD-R, is that the TOC information cannot be recorded to the lead in area until the record completion (finalization) is finally directed, since there is a possibility that information may be added to be written into the remaining program area. For this reason, the partial CD-R is kept in such a state that no information is written in the lead in area and the lead out area. Therefore, each area has remained in the mirror surface finished state. In order to finally make the format of the CD-R same as that of the CD by directing the finalization, the recording and reproducing apparatus of the CD-R records the predetermined information and the TOC information recorded in the PMA to the lead in area, as the sub-code. The recording and reproducing apparatus of the CD-R also records to the lead out area, the predetermined information indicating the area, as the sub-code. Accordingly, in the CD player, the reproduction of the finalized CD-R is made possible.

In this manner, the CD-R of write once read many type is provided. However, though the finalized CD-R can be reproduced in the conventional CD player, the information in the partial CD-R on which the information is recorded up to the middle thereof, is not constituted to be reproduced by the CD player, although the reproducible information is stored in the program area thereof. This is because the CD player does not have the mechanism for accessing the PMA, although the TOC information is recorded in the PMA provided in the inner circumferential side of the lead in area in the partial CD-R, as mentioned above. The conventional CD player is not adapted to cope with the reading control of such a partial CD-R, so that a servo-control system thereof may run recklessly if it reads the lead in area and lead out area since these areas are still in the mirror surface finished state, a servo-control system may run recklessly if the conventional CD player reads these areas. The correspondence of reading control was not made in this manner.

As a countermeasure of this, it may be proposed to construct a CD player to have a mechanism to access the PMA, and mechanism for reading the guiding groove and controlling the tracking and spindle, as in the case of the CD-R recording and reproducing apparatus. However, it is not preferred in an economical sense relative to the effect, to provide such mechanisms only for the partial CD-R.

Therefore, a CD player is resulted to be developed which can easily reproduce the partial CD-R in the middle of writing, and can reproduce the program area just by a change in control, without adding any element mechanically. Namely, it is constructed such that it controls to perform the set up in the program area even when it is the case where a usual set up cannot be performed because the lead in area is a mirror surface, and it performs the reproduction control of the record information in the program area without the TOC information.

However, there are the following problems, in this technique. Namely, in the usual CD or the finalized CD-R, the lead out area can be prepared, and thus the end of the program area can be detected. However, as shown in FIG. 1, the area after the end of the program area PA in the partial CD-R 102, is left to be in the mirror surface finished state, since it is the area for write once read many. For this reason, in the reproduction of the record information in the partial CD-R, such a situation occurs that the pickup goes beyond the end of the program area PA into the mirror surface portion, so that the servo-control system runs recklessly, or the tracking control is triggered to reproduce the last track meanderingly.

SUMMARY OF THE INVENTION

It is therefore a first object of the present invention to provide a method of controlling reproduction finish of an optical disc reproducing apparatus, which can finish the information reproduction at the end of the program area, without any trouble in reproducing the optical disc of write once read many type such as a partial CD-R etc., in the middle of writing.

It is a second object of the present invention to provide an optical disc reproducing apparatus for performing the reproduction finish controlling method of the present invention.

According to the present invention, the above mentioned first object can be achieved by a method of controlling reproduction finish of an optical disc reproducing apparatus for reproducing an optical disc having a program area, in which information is recorded one after another in a radial direction from an inner circumference of the program area toward an outer circumference thereof, the information including recording position information arranged at a predetermined interval in the radial direction. The controlling method includes the steps of: reading the recording position information one after another at the time of an information reproduction of the program area; continually comparing a presently read recording position information with a previously read recording position information, which has been read immediately before the presently read recording position information; moving a reading position by a predetermined number M of tracks toward the outer circumference, when the previously read recording position information indicates a more outer circumferential side than the presently read recording position information according to a result of comparing; distinguishing whether reading of the information at the reading position after moving is normal or not; and moving the reading position by a predetermined number N of tracks, which is greater than the number M, toward the inner circumference, when reading is not normal according to a result of distinguishing, and finishing the information reproduction.

According to the present invention, the above mentioned second object can be achieved by an optical disc reproducing apparatus for reproducing an optical disc having a program area, in which information is recorded one after another in a radial direction from an inner circumference of the program area toward an outer circumference thereof, the information including recording position information arranged at a predetermined interval in the radial direction. The optical disc reproducing apparatus includes: a device for reading the recording position information one after another at the time of an information reproduction of the program area; a device for continually comparing a presently read recording position information with a previously read recording position information, which has been read immediately before the presently read recording position information; a device for moving a reading position by a predetermined number M of tracks toward the outer circumference, when the previously read recording position information indicates a more outer circumferential side than the presently read recording position information according to a result of comparing; a device for distinguishing whether reading of the information at the reading position after moving is normal or not; and a device for moving the reading position by a predetermined number N of tracks, which is greater than the number M, toward the inner circumference, when reading is not normal according to a result of distinguishing, and finishing the information reproduction.

The controlling method of the present invention is to control reproduction finish of an optical disc, to which information is sequentially recorded in the direction from the inner circumference to the outer circumference like a CD, and to which the recording position information, such as the piece number of the record information, and the recording time, are recorded at a predetermined interval like a sub-code. The present invention judges the reproduction finish by use of the tracking-servo controlling operation, which prevents the tracking from being out, when the tracking is about to be out while reading the boundary of the program area and the mirror surface portion in the partial CD-R, or while reading the position having a crack on the optical disc.

Namely, in this method, the recording position information is read one after another, at the time of reproducing the record information of the program area, which is performed from the inner circumference toward the outer circumference. The presently read recording position information and the previously read recording position information which has been read immediately before, are continually compared one after another.

In case that the last track at the boundary with the mirror surface portion is read, when the tracking by the tracking servo-control is about to be out of the last track, the control is performed to return it to the last track. Therefore, in such a case, the recording position read immediately before, becomes an outer circumferential side. When such an abnormal state is detected, the reading position is jumped and moved to the outer circumferential side by the predetermined number of tracks. And, at the position after movement, it is judged whether reading can be normally performed or not. If reading can be normally performed at the position after jumping, the cause of abnormality is judged to be a crack, and the reproduction is continued. If reading cannot be normally performed at the position after jumping, the position is judged to be the boundary with the mirror surface portion of the partial CD-R etc., i.e. the end of the program area. Thus, the reading position is moved toward the inner circumferential side, and the reproduction is finished.

The nature, utility, and further features of this invention will be more clearly apparent from the following detailed description with respect to preferred embodiments of the invention when read in conjunction with the° accompanying drawings briefly described below.

DETAILED DESCRIPTION OF THE PREFERRED EMBODIMENTS

Hereinbelow, with reference to the drawings, embodiments of the present invention will be explained.

Figure 1:
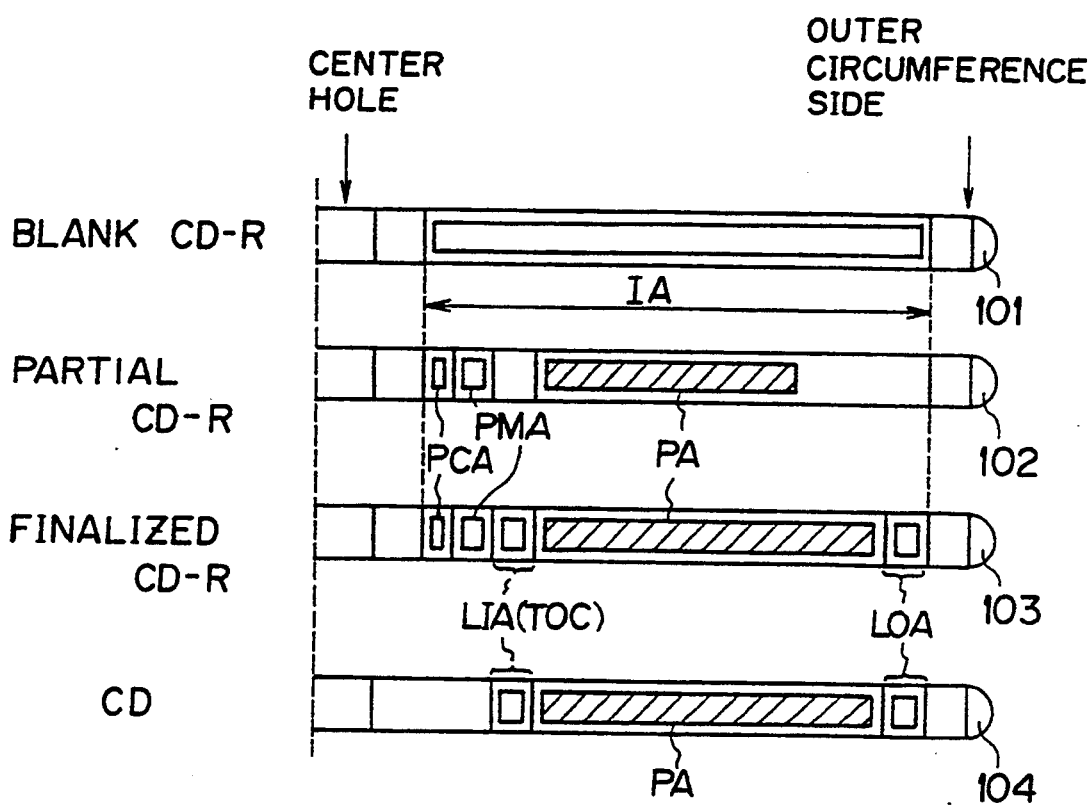
FIG. 1 is a diagram of formats of the CD-R in various states and the CD.
Figure 2:
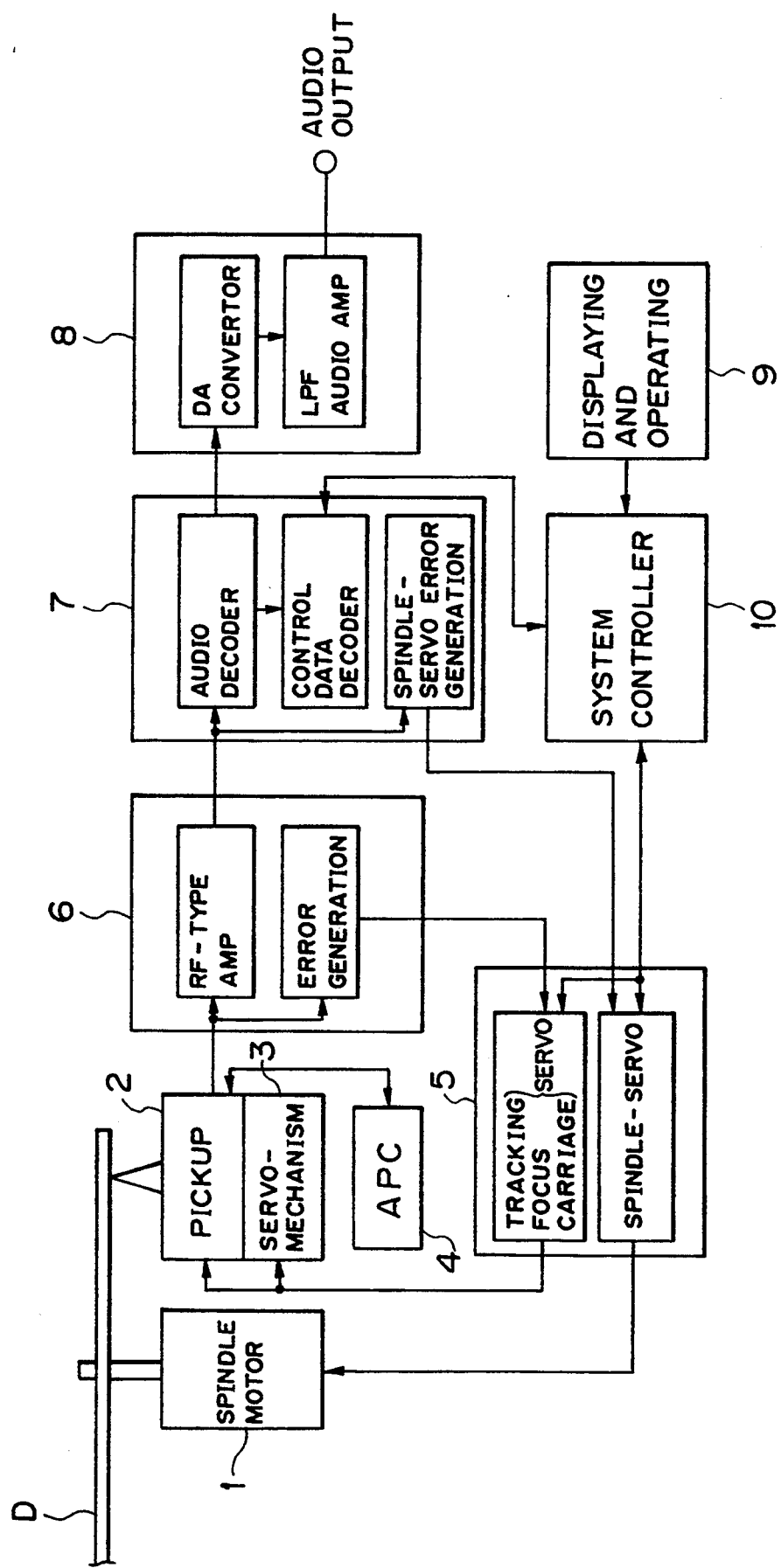
FIG. 2 is a block diagram of a CD player to which the present invention is applied.

FIG. 2 shows a block diagram of a CD player to which the present invention is applied.

As shown in FIG. 2, the CD player to which the present invention is applied, is provided with a spindle motor 1, a pickup 2, a servo-control mechanism 3, an auto power controller 4 (APC), a servo-control section 5, a preamplifier section 6, a decoder section 7, a D/A converter section 8, a display and operation section 9, and a system controller section 10.

The spindle motor 1 rotationally drives an optical disc D. The pickup 2 reproduces a RF (Radio Frequency) signal by irradiating a laser spot onto the pit on the disc D, and photo-electric-converting the reflective light. The servo-control mechanism 3 moves the pickup 2 in the radial direction of the disc D, and performs positioning to the track. The auto power controller (APC) 4 keeps the output of the laser light of the pickup 2 constant. The servo-control section 5 servo-controls the spindle motor 1, the pickup 2, and the servo-control mechanism 3. The preamplifier section 6 amplifies the RF signal reproduced from the pickup 2, and generates the servo-control signal to the servo-control section 5. The decoder section 7 performs the signal processes, such as an EFM recovery process, an error correction, etc. of the amplified RF signal, and reproduces audio data. And, the decoder section 7 reproduces control data from the sub-coding, and generates the servo-control signal for the spindle servo-control. The D/A converter section 8 carries out the D/A conversion of the audio data generated by the decoder section 7, and generates an audio output. A display and operation section 9 is an apparatus for displaying a state of operation etc. and, for inputting the operation indication. The system controller section 10 consists of a microprocessor, a memory, etc., and controls the whole apparatus.

Figure 3:
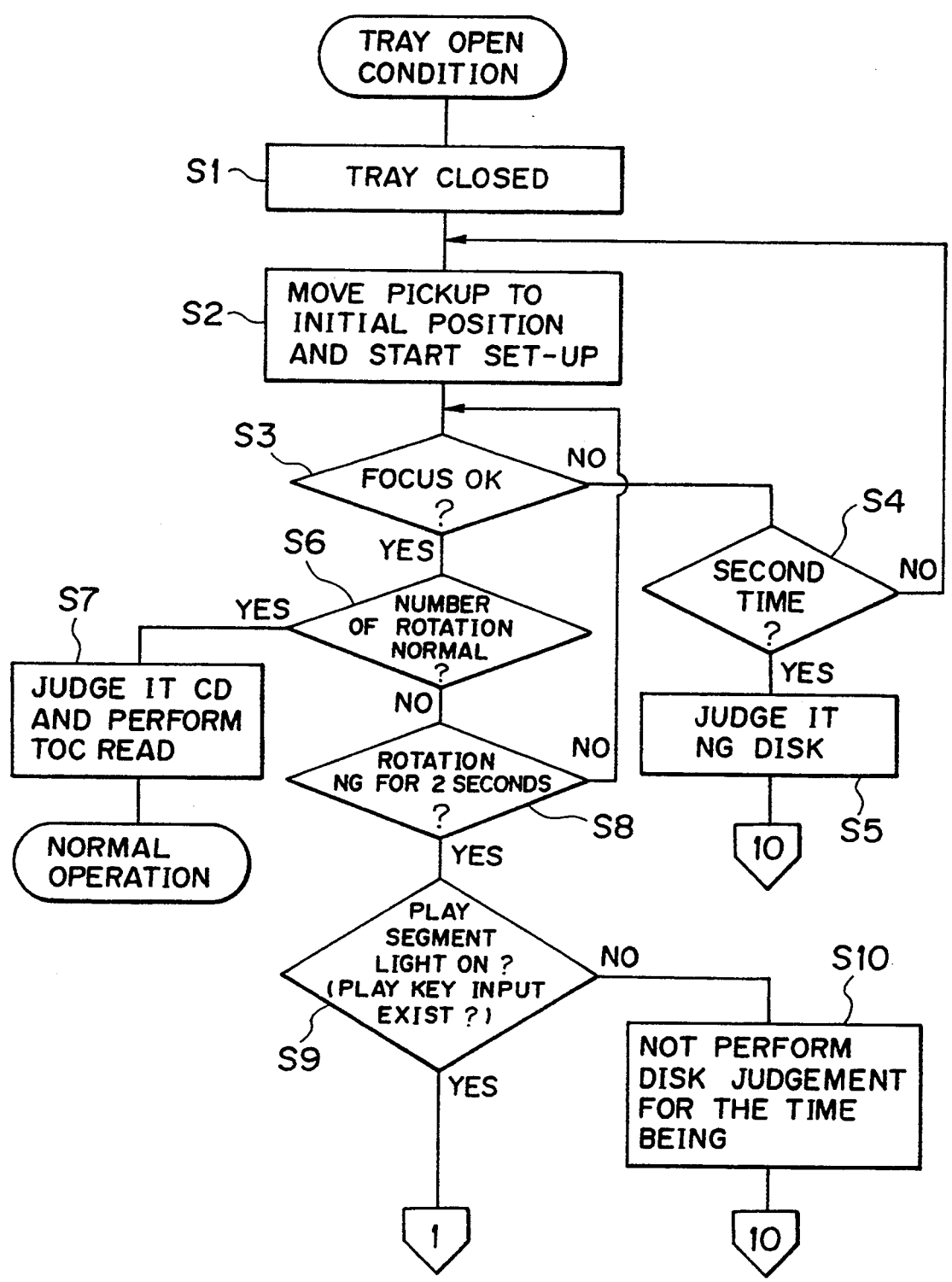
FIG. 3 is a process flow chart of an initial set up of a system controller section in an embodiment.
Figure 4:
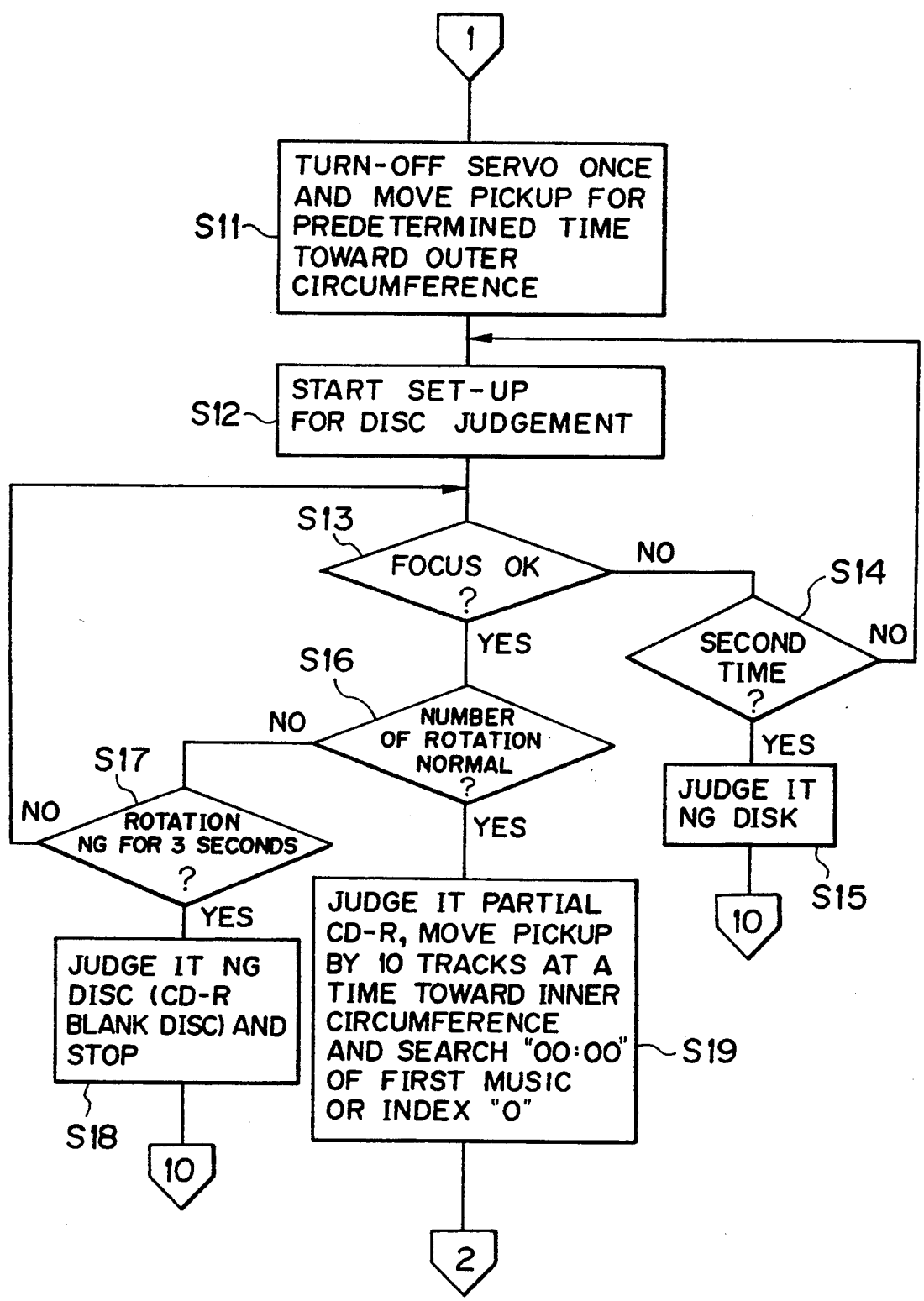
FIG. 4 is a process flow chart of disc judgement of the system controller section in the embodiment.
Figure 5:
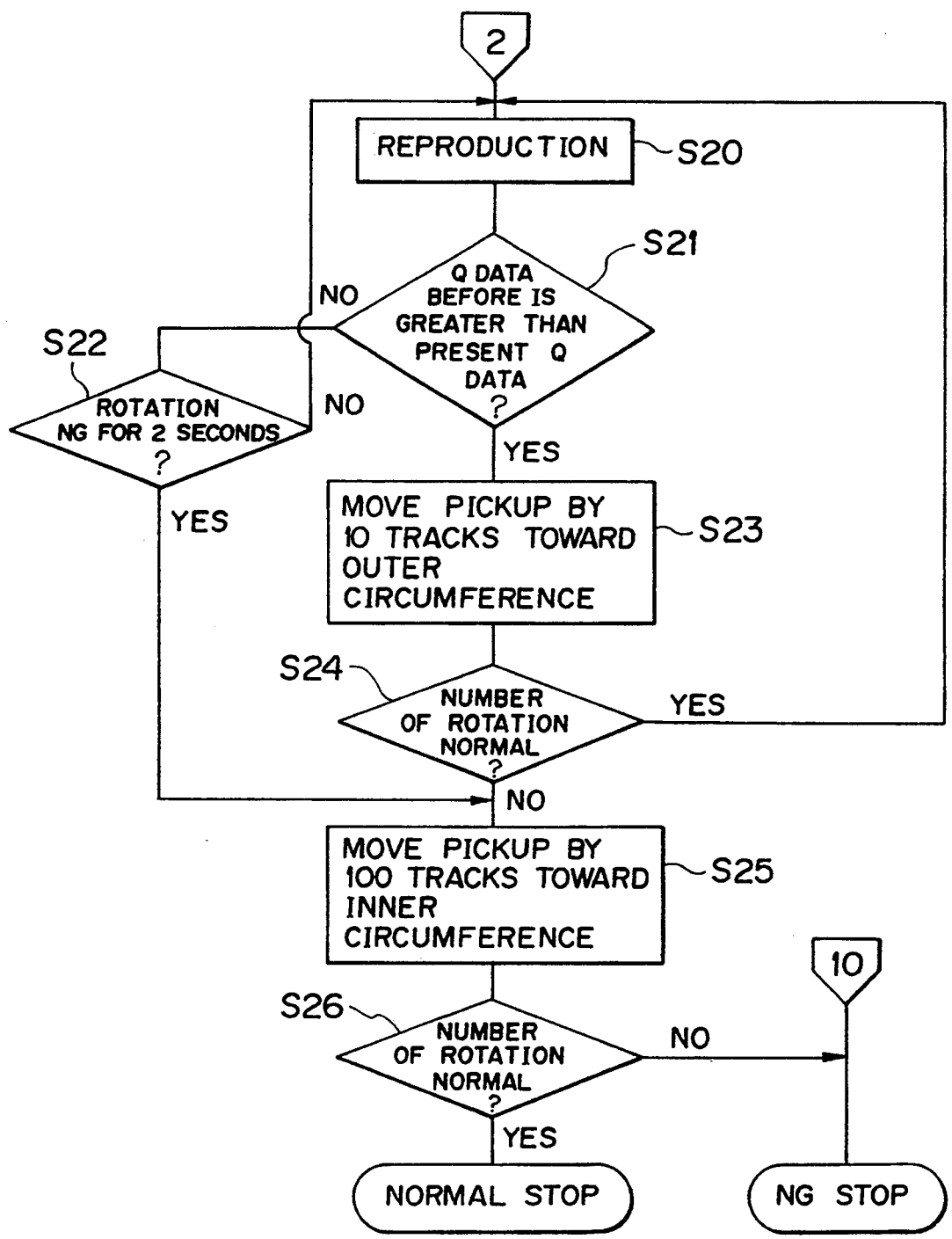
FIG. 5 is a process flow chart of a reproduction finish of the system controller section about the reproduction of the partial CD-R of the embodiment.

FIG. 3 to FIG. 5 show the process flow charts about the reproduction control of the disc D by the system controller section 10.

The CD player of the present embodiment is constituted so that, when the partial CD-R is set thereto, it may reproduce the record information on the program area of it. FIG. 3 to FIG. 5 show mainly the flow charts indicating the control process of the system controller section 10 in the reproduction of the partial CD-R.

FIG. 3 shows the initial set up process immediately after setting the disc D. FIG. 4 shows the disc judging process in case that the initial set up cannot be performed and the PLAY key is pushed to indicate the reproduction. FIG. 5 shows the reproduction process including the method of controlling reproduction finish of the present invention.

FIG. 6 shows the explanation diagram of the reading position of the pickup 2 from the set up, through the reproduction to the reproduction finish, with respect to the partial CD-R.

It will be explained the reproduction control process of the system controller section 10, in the order from FIG. 3.

Step S1, S2: Firstly, the system controller section 10 detects that the tray for placing the disc D is closed from the open state, and that the disc D is placed. Then, the system controller section 10 moves the pickup 2 to the initial position by controlling the servo-control section 5, and starts the set up (SET UP) process. Here, the initial position is the position decided by the detection switch (not illustrated). Generally, this position is set in a hardware manner, such that it may become near the boundary of the lead in area and the program area of the disc D.

Step S3, S4, S5: Nextly, the system controller section 10 checks the focusing by use of the signal from the servo-control section 5. If it is in the state where the focus is not settled, the flow goes back to the step 2, and, the system controller section 10 performs the positioning to the initial position again, so as to start the set up, and re-check focusing. If the focus is not still settled, the system controller section 10 judges that it is a poor disc (it is referred as "NG disc", hereinbelow,), and terminates the process.

Step S6, S7: If focusing is normal, the system controller section 10 further checks whether the number of rotations of the spindle motor 1 is correctly servo-controlled by the signal from the servo-control section 5. If it is normal, the system controller section 10 judges that the reproduced disc D is a normal CD. And, the system controller section 10 performs the reading process of the TOC, and performs the usual operation in the same manner as the conventional cases.

Step S8, S9, S10: If the number of rotations of the spindle motor 1 is not normal, the system controller section 10 waits for 2 seconds. If the abnormal state continues for 2 seconds, the system controller section 10 checks nextly whether the PLAY segment (it is not illustrated) is lighted or not (the existence of the input of the PLAY key). If it is not lighted, the system controller section 10 judges that it is the defect of the number of rotations (GFS-NG) for the time being, and terminates the process, without judging the disc.

According to the processes up to this stage, when the blank CD-R or the partial CD-R is set, the set up at the initial position cannot be performed, since the lead in area is in the mirror surface finished state.. However, in the present embodiment, in case that the disc is set and the PLAY key is pressed, the process shown in FIG. 4 is successively performed so as to try the reproduction, as following.

Figure 6A:
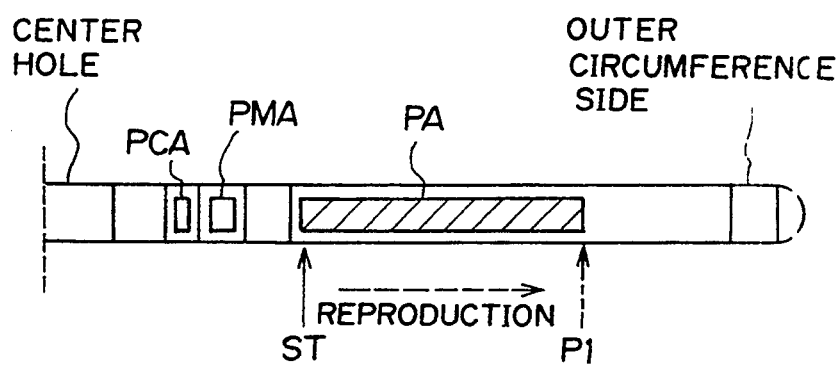
FIG. 6 consisting of FIGS. 6A and 6B, are diagrams of a reading position of a pickup of the embodiment.
Figure 6B:
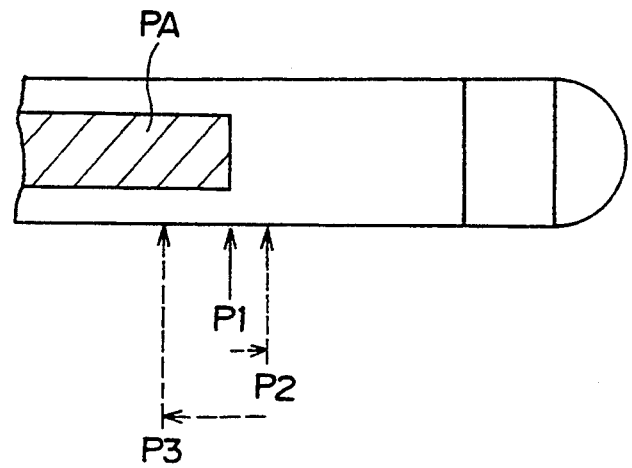

Step S11, S12: When the PLAY segment (not illustrated) is lighted (i.e. when there exists the input by the PLAY key), the system controller section 10 controls the servo-control section 5, so as to once turn off the servo-control. The system controller section 10 moves the pickup 2 in the direction toward the outer circumference for a predetermined time period. When the movement is completed, the system controller section 10 starts the set up at the position. The movement time in this case is time sufficient for the pickup 2 to be positioned in the program area of the disc by the CD standard. Thereby, as shown in FIG. 6A, the reading position (arrow ST) of the pickup 2 is positioned in the program area PA.

Step S13, S14, S15: Nextly, the system controller section 10 checks the focusing,-by use of the signal from the servo-control section 5. If it is in the state where the focus is not settled, the flow goes back to the step S12, and the system controller section 10 starts the set up again, so as to re-check the focusing. If the focus is not still settled, the system controller section 10 judges that it is the NG disc, and finishes the process.

Step S16, S17, S18: If the focusing is normal, the system controller section 10 further checks whether the number of rotations of the spindle motor 1 is normally servo-controlled or not by use of the signal from the servo-control section 5. In case that the number of rotations is not normal, the system controller section 10 waits for 3 seconds. And, if the abnormal state continues for 3 seconds, the system controller section 10 judges that it is the NG disc (blank CD-R), and finishes the process.

Step S19: If the number of rotations of the spindle motor 1 is normal, the system controller section 10 judges that the reproduced disc D is the partial CD-R, and moves the pickup 2 by 10 tracks at a time one after another toward the inner circumference. And, the system controller section 10 obtains the channel Q data of the sub-code from the decoder section 7, and search the position of "00:00" of the first music, or the position of the index "0" of the first music. After this, the system controller section 10 finishes the movement.

By the above explained steps, the preparation for reproducing the partial CD-R, is completed. The reproduction process to be successively performed, will be explained with referring to the flow chart of FIG. 5.

Step S20, S21, S22: The system controller section 10 starts the usual reproduction. The system controller section 10 gets and stores the channel Q data of the sub-code read in reproduction from the decoder section 7. At the same time, the system controller section 10 compares the channel Q data of this presently read sub-code, with the channel Q data obtained at the last time. It is judged, by this comparison, whether the previous data is greater than the present data as for the absolute time information which is the recording position information. If the present absolute time information is greater, the system controller section 10 judges that it is normal. Successively, the system controller section 10 judges whether the number of rotations is normal or not, by use of the signal from the servo-control section 5. If it is normal, the system controller section 10 continues the reproduction. If it is not normal, the system controller section 10 waits for 2 seconds. If the abnormal state continues for 2 seconds, the system controller section 10 judges that the abnormal state in reproduction occurs, and the flow goes to the step S25.

Step S23, S24: If the previous data is greater than the present data in the comparison of the channel Q data, the system controller section 10 judges that it is the abnormal state in reproduction. And, the system controller section 10 jumps the pickup 2 by 10 tracks (10 Tr JUMP FWD) toward the outer circumference, and moves the reading position (see FIG. 6B; the reading position is moved to the arrow P2 from the arrow P1 in the figure) by controlling the servo-control section 5. And, the system controller section 10 judges whether the number of rotations is normal or not, at the position after the movement. If it is normal, the system controller section 10 judges that it is the abnormal state in reproduction due to a crack, a dust etc., and continues the reproduction without processing. If the number of rotations is not normal, the system controller section 10 judges that it is the end of the program area (referring to the arrow P1 position of FIGS. 6A and B).

Step S25, S26: Nextly, the system controller section 10 jumps the pickup 2 by 100 tracks (100 Tr JUMP REV) toward the inner circumference, and moves the reading position (see FIG. 6B, the reading position is moved to the arrow P3 from the arrow P2 in this figure). And, the system controller section 10 judges whether the number of rotations is normal or not, at the position after the movement. If it is normal, the system controller section 10 finishes the reproduction by a normal stop operation. The normal stop operation is a stop operation to stop by applying brake with respect to the rotation. If the rotation is not normal at the position after the movement toward the inner circumference, the system controller section 10 finishes the reproduction by a NG stop operation. The NG stop operation is a stop operation to turn off the servo-control, and reject the key input for 10 seconds until the number of rotations falls down, without performing other operations.

In this manner, in the CD player of the present embodiment, such a control is performed that makes possible the reproduction corresponding to the partial CD-R. Further, such a control is performed that, by use of the following operations (1) and (2), with respect to the boundary of the mirror surface portion at the end of the program area in the reproduction, so as to finish the reproduction without any trouble.

(1) The reproduction finish based on the defect in the number of rotations (2) The reproduction finish based on the absolute time (channel Q data) comparison In addition, the operation with respect to the PLAY key input after judging that it is the NG disc, is begun from the initial set up after the tray closing from the step S2, so that the disc judgement is performed again.

Further, in the above mentioned embodiment, the jump in the direction toward the outer circumference is set to 10 tracks and the jump in the direction toward the inner circumference is set to 100 tracks when the abnormal state in reproduction happens. However, the present invention is not limited to those, as long as the quantity of the lump toward the inner circumference is greater than that of the jump toward the outer circumference, so as to carry out the normal stop.

Moreover, in the above embodiment, the partial CD-R is explained. However, the present invention is not limited to the partial CD-R. The present invention is also effective similarly to the optical disc to which the recording position information, such as absolute time etc., are recorded and in which the end of the program area consists of the mirror surface.

As described above, according to the method of controlling reproduction finish of the optical disc reproducing apparatus of the present invention, the following effect can be achieved. Namely, the reproduction can be ended without trouble at the end of the program area with respect to the optical disc, a portion of which after the program area consists of the mirror surface portion. For example, the partial CD-R can be easily reproduced by the CD reproducing apparatus according to the present invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of controlling reproduction finish of an optical disc reproducing apparatus for reproducing an optical disc having a program area, in which information is recorded one after another in a radial direction from an inner circumference of said program area toward an outer circumference thereof, said information including recording position information arranged at a predetermined interval in the radial direction, said method comprising the steps of:

reading the recording position information one after another at the time of an information reproduction of the program area;

continually comparing a presently read recording position information with a previously read recording position information, which has been read immediately before the presently read recording position information;

moving a reading position by a predetermined number M of tracks toward the outer circumference, when the previously read recording position information indicates a more outer circumferential side than the presently read recording position information according to a result of comparing;

distinguishing whether the reading position after moving is in an information unrecorded area where the information reproduction cannot be normally performed or in an information recorded area where the information reproduction can be normally performed; and moving the reading position by a predetermined number N of tracks, which is greater than said number M, toward the inner circumference, when the reading position after moving is in the information unrecorded area according to a result of distinguishing, and finishing the information reproduction by stopping rotating the optical disc.

2. A method according to claim 1, further comprising the steps of:

judging whether a focusing condition in the reading step is settled or not, and moving the reading position to a predetermined initial set up position to start a set up of the information reproduction if the focusing condition is judged not to be settled; and judging again whether the focusing condition is settled or not, and finishing the information reproduction if the focusing condition is judged not to be settled again.

3. A method according to claim 1, wherein said recording position information comprises absolute time information.

4. A method according to claim 1, wherein said optical disc comprises a CD-R, which is a recordable optical disc of write once read many type.

5. A method according to claim 1, further comprising the step of:

rotating the optical disc by means of servo-controlling; and judging whether a rotation number of the optical disc is normal or not after moving the reading position toward the inner circumference;

stopping the optical disc by braking a rotation of the optical disc if the rotation number is judged to be normal when finishing the information reproduction; and stopping the optical disc by turning off the servo-controlling of the optical disc for a predetermined period of time if the rotation number is judged to be not normal when finishing the information reproduction.

6. A method according to claim 1, further comprising the step of performing a rotation servo-control, a focus servo-control and a track servo-control of the optical disc, on the basis of the read recording position information, wherein
the distinguishing step comprises the step of distinguishing whether at least one of a focusing condition and a rotation number of the optical disc at the reading position after moving is normal or not, and
the reading position is moved toward the inner circumference, when said at least one of the focusing condition and the rotation number is not normal according to a result of distinguishing.

7. An optical disc reproducing apparatus for reproducing an optical disc having a program area, in which information is recorded one after another in a radial direction from an inner circumference of said program area toward an outer circumference thereof, said information including recording position information arranged at a predetermined interval in the radial direction, said apparatus comprising:
means for reading the recording position information one after another at the time of an information reproduction of the program area;
means for continually comparing a presently read recording position information with a previously read recording position information, which has been read immediately before the presently read recording position information;
means for moving a reading position by a predetermined number M of tracks toward the outer circumference, when the previously read recording position information indicates a more outer circumferential side than the presently read recording position information according to a result of comparing;
means for distinguishing whether the reading position after moving is in an information unrecorded area where the information reproduction cannot be normally performed or in an information recorded area where the information reproduction can be normally performed; and
means for moving the reading position by a predetermined number N of tracks, which is greater than said number M, toward the inner circumference, when the reading position after moving is in the information unrecorded area according to a result of distinguishing, and finishing the information reproduction by stopping rotating the optical disc.

8. An optical disc reproducing apparatus according to claim 7, wherein said reading means comprises an optical pickup, and said moving means comprises a servo-mechanism adapted to move the optical pickup in the radial direction.

9. An optical disc reproducing apparatus according to claim 7, wherein said comparing means and said distinguishing means comprise a system controller.

10. An apparatus according to claim 7, further comprising means for performing a rotation servo-control, a focus servo-control and a track servo-control of the optical disc on the basis of the read recording position information, wherein
said distinguishing means distinguishes whether at least one of a focusing condition and a rotation number of the optical disc at the reading position after moving is normal or not, and
said moving means moves the reading position toward the inner circumference, when said at least one of the focusing condition and the rotation number is not normal according to a result of distinguishing.

11. An optical disc reproducing apparatus for reproducing an optical disc having a program area, in which information is recorded one after another in a radial direction from an inner circumference of said program area toward an outer circumference thereof, said information including recording position information arranged at a predetermined interval in the radial direction, said apparatus comprising:
an optical pickup for reading the information one after another;
a processing means for processing the information read by said optical pickup;
a driving means for moving said optical pickup in the radial direction; and
a controller for continually comparing a presently read recording position information with a previously read recording position information, which has been read immediately before the presently read recording position information, directing said drive means to move said optical pickup by a predetermined number M of tracks toward the outer circumference when the previously read recording position information indicates a more outer circumferential side than the presently read recording position information, distinguishing whether the reading position after moving is in an information unrecorded area where the information reproduction cannot be normally performed or in an information recorded area where the information reproduction can be normally performed, and directing said driving means to move said optical pickup by a predetermined number N of tracks, which is greater than said number M, toward the inner circumference when the reading position after moving is in the information unrecorded area to finish an information reproduction by stopping rotating the optical disc.

12. An apparatus according to claim 11, further comprising means for servo-tracking and servo-focusing said optical pickup.

13. An apparatus according to claim 11, further comprising means for performing a rotation servo-control, a focus servo-control and a track servo-control of the optical disc on the basis of the read recording position information, wherein said controller distinguishes whether at least one of a focusing condition and a rotation number of the optical disc at the reading position after moving is normal or not, and directing said driving means to move said optical pickup toward the inner circumference when said at least one of the focusing condition and the rotation number is not normal.

* * * * *